Jan. 31, 1939.    W. A. BELFIELD    2,145,413
PROPELLER
Filed Dec. 16, 1936    3 Sheets-Sheet 1

INVENTOR.
WILLIAM A. BELFIELD.
BY Joshua R. H. Hopps
ATTORNEY.

Jan. 31, 1939.  W. A. BELFIELD  2,145,413
PROPELLER
Filed Dec. 16, 1936   3 Sheets-Sheet 2
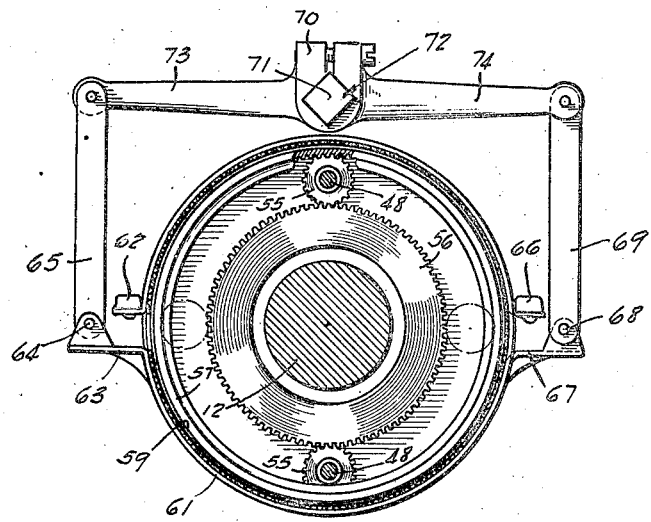
FIG. 4
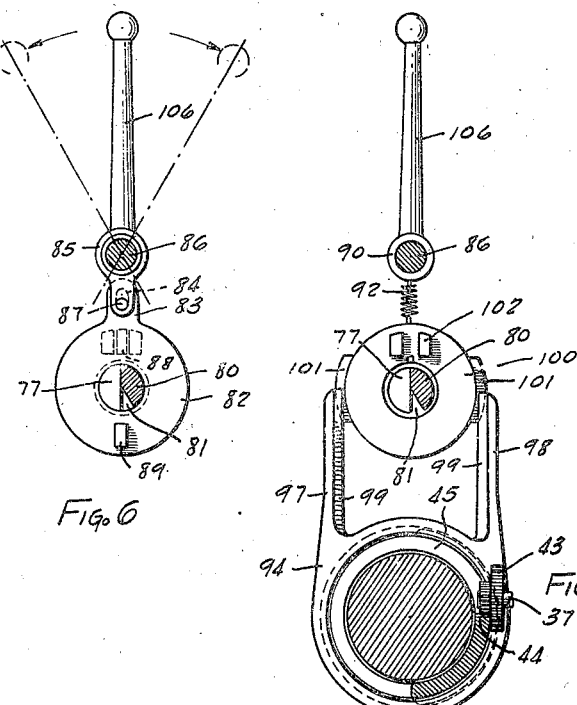
FIG. 6
FIG. 5
INVENTOR.
WILLIAM A. BELFIELD.
BY Joshua R H Potts
ATTORNEY.

Jan. 31, 1939.  W. A. BELFIELD  2,145,413
PROPELLER
Filed Dec. 16, 1936   3 Sheets-Sheet 3

INVENTOR.
WILLIAM A. BELFIELD.
BY
ATTORNEY.

Patented Jan. 31, 1939

2,145,413

UNITED STATES PATENT OFFICE 2,145,413

PROPELLER

William A. Belfield, Philadelphia, Pa.

Application December 16, 1936, Serial No. 116,075

4 Claims. (Cl. 170—160)

This invention has to do with propellers such as are commonly employed as means for driving aircraft, water vessels and the like, and is concerned primarily with propellers designed for use in aircraft.

The present invention is predicated on the recognition that greatest efficiency in the operation of aircraft can be obtained by varying the effective area of the driving propeller as various conditions such as speed, load, altitude and so forth change.

Accordingly, this invention has in view as its foremost objective the provision of a propeller which includes two or more blades, the effective area of which may be varied as occasion demands.

More particularly the invention has in view as a further objective the provision of a propeller of the character described in which the radial extent of the blades may be varied as circumstances dictate.

In carrying out the above noted objectives in a practical embodiment it becomes necessary to provide for the ready extension or retraction of the propeller blades, and to this end this invention has in view as a further objective the provision of mechanism which may be operated to complete this action on the part of the propeller blades.

More in detail, this invention contemplates availing of the rotary motion of the shaft on which the propeller is mounted as the source of power for driving the mechanism which extends or retracts the blades. Inasmuch as there are certain limits to which the blades may be extended or retracted, an important feature of the invention resides in the provision of safety mechanism for insuring of the discontinuance of power to the extending and retracting mechanism when these limits are reached.

Various other more detailed objects and advantages such as those arising in connection with providing appropriate mechanisms for carrying out the above noted objectives, will in part become apparent, and in part be hereinafter stated, as the description of the invention proceeds.

The invention, therefore, comprises a propeller having extensible blades together with mechanism operable under the influence of the rotary motion of the shaft on which the propeller is mounted for extending and retracting the blades, and this mechanism includes safety devices for discontinuing power to these mechanisms when limits of extension or retraction have been reached.

For a full and more complete understanding of the invention, reference may be had to the following description and accompanying drawings wherein Figure 1 is a side view partly in section and partly in elevation, taken through a propeller and associated mechanism, which is made in accordance with the precepts of this invention. In this view the sectional showing through the propeller hub is taken on different planes.

Figure 2 is a section taken through one of the propeller blades, while

Figure 1:
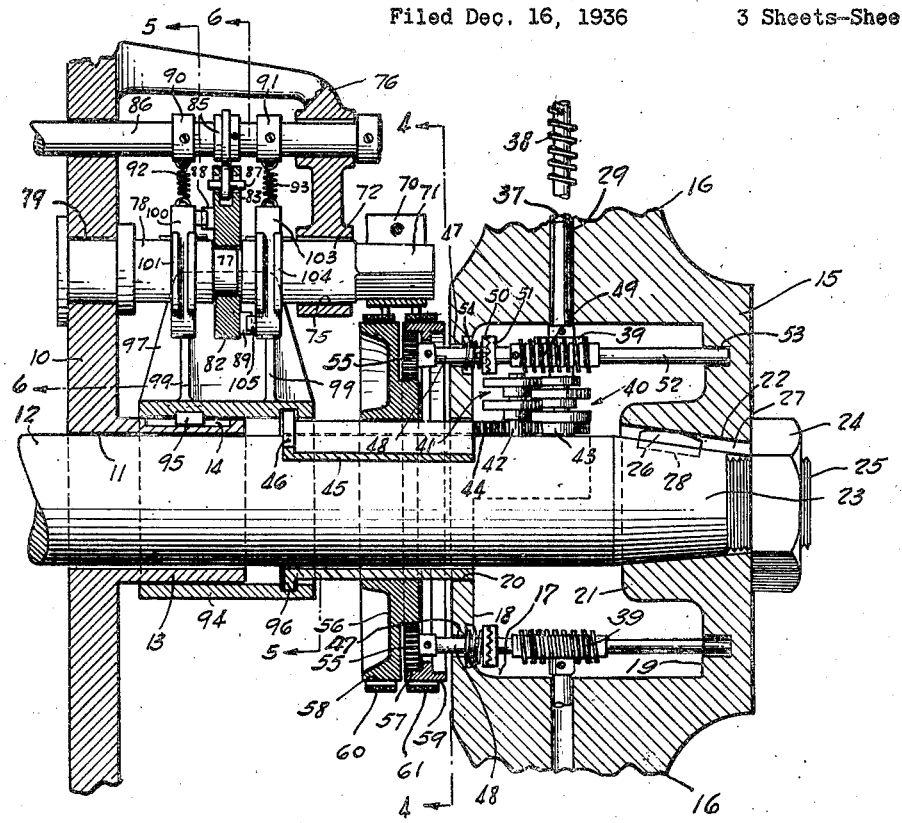
Figure 7:
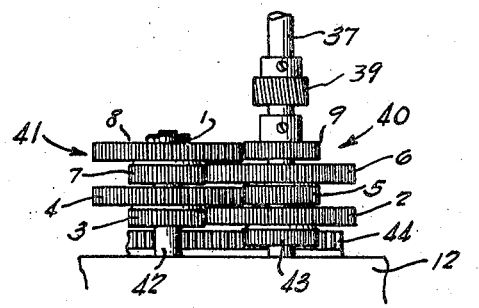
Figure 8:
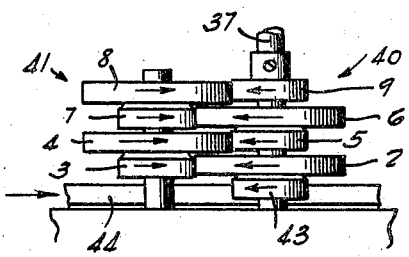
Figure 9:
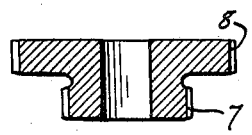

Figure 4 is a sectional showing taken at right-angles to the showing of Figure 1. This view is taken about on the plane represented by the line 4—4 of Figure 1, Figure 5 is another sectional showing somewhat similar to Figure 4, taken about on the plane represented by the line 5—5 of Figure 1, and Figure 6 is a view somewhat similar to Figure 5, taken on the plane represented by the line 6—6 of Figure 1, Figure 7 is an enlarged detailed elevational showing of the reduction gear assembly, Figure 8 is a view similar to Figure 7, but somewhat diagrammatic, bringing out the direction of rotation of the gears in the reduction gear assembly, and Figure 9 is a section through one of the gear units.

Referring now to the drawings, wherein like reference characters denote corresponding parts, a framework intended as a mounting for the propeller of this invention is represented at 10. While this framework is primarily intended to be a portion of an aircraft, it is to be clearly understood that the invention is not to be limited in this respect, as this propeller might be appropriately mounted in any place where its use is advantageous.

The framework 10 is provided with a bore at 11 through which extends a propeller shaft designated 12. It is notable that the framework 10 is provided with a tubular extension 13 through which the bore 11 continues. This sleeve 13 is provided with a keyway 14 for a purpose to be later described.

Mounted at the extremity of the propeller shaft 12 is a hub construction identified as 15, and from which hub project blade stems 16. At this point it is well to note that while the present invention is illustrated and described in conjunction with a propeller having a pair of diametrically oppositely disposed blade stems 16, the invention is not to be limited in this respect as it may be employed in conjunction with any desired number of these blades.

The propeller hub 15 is of a hollow construction providing a recess which is defined by a substantially cylindrical wall 17 and end walls 18 and 19. The end wall 18 is formed with an opening 20, through which passes the shaft 12, while the end wall 19 is formed with a sleeve-like projection 21 which extends inwardly into the recess. This sleeve 21 is formed with a tapered socket 22 which receives the conical end 23 of the propeller shaft 12.

A nut, shown at 24, may be screwed on the threaded extremity 25 of the shaft to maintain the hub 15 assembled on the shaft 12. As shown in Figure 1, a key 26 is fitted in aligned keyways 27 and 28 formed on the hub 15 and conical portion 23 of the shaft 12 respectively, to establish the driving relationship between the hub 15 and shaft 12.

Figure 2:
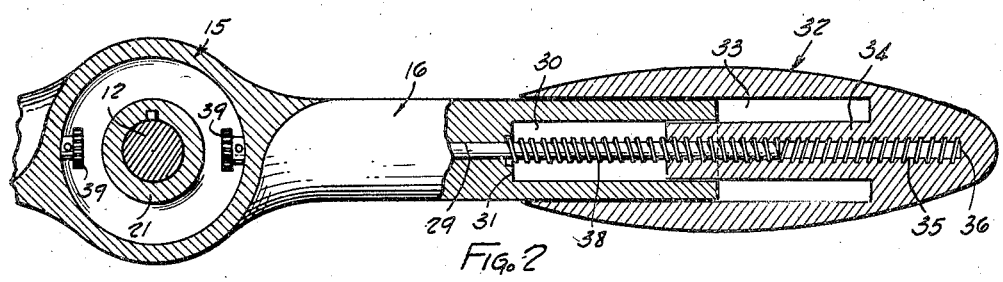

As shown in Figure 2, each of the blade stems 16 is provided with a central bore 29 which is enlarged adacent to the end of the blade to provide a recess 30, there being a shoulder 31 between the bore 29 and enlarged portion 30. A blade extension is shown at 32, and is formed with a recess 33 which receives the blade stems 16. The blade extension 32 is of the usual propeller blade formation, and projecting inwardly from the outer end of the blade extension 32 into the recess 33 is a projection 34 which is slidably received in the recess 30 of the stem 16.

Extending centrally through this projection 34 is a threaded socket 35 which terminates adjacent to the end of the blade extension, as shown at 36.

A shaft shown at 37 is rotatably carried in the bore 29, and held against longitudinal movement in the blade stem 16. The outer portion of this blade 37 is threaded, as shown at 38, and this threaded portion is received in the threaded socket 35 of the extension 32. The shaft 37 projects inwardly into the recess defined by the cylindrical wall 17, and that portion of the shaft which extends thereinto carries a worm gear 39, and between the worm gear 39 and the extremity of the shaft 37 the latter carries a plurality of gears identified at 40, which constitute a part of a reduction gear assembly.

These gears 40 cooperate with other gear elements 41 carried by a stub shaft 42 that extends radially outwardly from the shaft 12 to provide a desired gear reduction.

It is to be understood that the number and design of these gear members 40 and 41 will vary as circumstances dictate, but their function is to provide a noticeable reduction so that a gear loosely carried on the end of the shaft 37 will have a greatly reduced rotative movement with respect to the shaft 37. The gears, which are referred to generally as 40 and 41, comprise a gear 9 of relatively small diameter which is drivably carried by the shaft 37. This gear 9 meshes with the larger gear 8 of a gear unit comprising a pinion 7 and gear 8. This unit 7 and 8 is rotatably mounted on the stub shaft 42 and the pinion 7 and gear 8 rotate as a unit, and for all functional purposes may be considered as integrally formed.

The pinion 7 in turn meshes with a gear 6 that is a part of another gear unit comprising a pinion 5 and the gear 6. Thus unit 5—6 is rotatably mounted on the shaft 37. The pinion 5 is in mesh with a gear 4 that is a part of a gear unit comprising a pinion 3 and the gear 4, and this unit 3—4 is mounted for rotation on the stub shaft 42. The pinion 3 meshes with the gear 2 that is a part of the unit comprising this gear 2 and the gear 43. The unit 2—43 is mounted for rotation on the shaft 37.

The mode of the assembly of the above described reduction gears comprising the parts 40 and 41 is believed to be obvious. Prior to positioning of the propeller shaft 12 in the hub 15 the various gears referred to generally as 40 are assembled on the shaft 37. Thus when the propeller shaft 12 is positioned the extremity of the shaft 37 is so close thereto as to cause the propeller shaft 12 to prevent removal of the gears 40.

A nut referred to as 1 may be positioned on one end of the stub shaft 42 to prevent removal of the gears 41 therefrom. Obviously the end wall 18 of the hub 15 of the propeller may be provided with a suitable opening through which the stub shaft 42 and gearing 41 carried thereby may pass in assembling the shaft 12 in the hub 15.

In each instance a small pinion and large gear, such as the pinion 7 and gear 8 is described as a single unit, and Figure 9 develops this unit when it consists of a single piece of metal machined to the proper formation.

This gear 43 engages a rack 44 formed as an extension on a sleeve 45 which is carried by the shaft 12; the sleeve 45 being movable axially of the shaft 12. The sleeve 45 is formed at one end with a flange 46 for a purpose to be later described.

The main body portion of the sleeve 45 completely encompasses the shaft 12 and any well-known key arrangement (not illustrated) may be employed to hold the sleeve 45 against rotation about the shaft 12. Thus the rack 44 is maintained in meshing engagement with the gear 43.

The mechanism above described, and that now to be described is associated with one of the blade stems 16, and as illustrated in the drawings, the drive to the shaft 37 of the other stem 16 is duplicated at the said other stem. However, there is need for only one of the gear assemblies 40—41 so this mechanism is not duplicated.

The end wall 18 is provided with an opening 47 in which is journaled a shaft 48. The shaft 48 terminates in a clutch element 50 which takes the form of a diamond toothed clutch member. Co-operating with this clutch member 50 is a complemental clutch element 51 which is carried by a shaft section 52 that is journaled in a recess 53 formed in the wall 19. A spring 54 encompasses the shaft section 52 and normally urges the clutch members 50 and 51 into driving engagement. A worm 49 is carried by the shaft section 52 and engages the worm gear 39.

Exteriorally of the hub 15, the shaft 48 drivably carries a pinion 55 that is disposed between an external planetary gear 56 and an internal planetary gear 57. These planetary gears 56 and 57 are carried about the sleeve 45, and each of them is provided with a braking surface identified at 58 and 59 respectively. A brake band 60 is associated with the braking surface 58, and another brake band 61 with the braking surface 59.

One end of the brake band 60 is anchored to the frame, as indicated at 62, while the other end represented at 63 is pivotally connected, as shown at 64, to a link at 65. In a like manner one end of the band 61 is anchored to the frame, as shown at 66, while the other extremity of the band 61 is shown at 67 and is pivotally connected as represented at 68 to a link 69. A yoke member 70 is crimped about a non-circular extremity 71 of a shaft 72, and extending from each side of the yoke member 70 are arms 73 and 74 which are pivotally connected to the links 65 and 69 respectively.

The shaft 72 is journaled in an opening 75 formed in a bracket member 76, which is carried by the frame 10.

At the end opposite to the non-circular portion 71 the shaft 72 is reduced in diametrical dimension, and cut away to provide a semi-circular projection 77. This semi-circular projection 77 is disposed entirely on one-half of the shaft 72. A second shaft 78 is journaled in an opening 79 of the framework 10, and its free extremity is reduced in a manner similar to the shaft 72 to provide a projection 80 which overlaps the projection 77.

There is a certain amount of free play between the overlapping projections 77 and 80, as represented at 81 in Figure 6. It is evident that the shafts 78 and 72 are in driving relationship with respect to each other, but with a certain amount of free play permitted therebetween.

A collar 82 is rotatably mounted on the projections 77 and 80, and at its upper extremity is formed with spaced ears 83 formed with slots 84. An arm 85 is carried by a shaft 86, and projects between the ears 83. A pin 87 is carried by the arm 85 and extends into the slots 84. Extending from one flat face of the collar 82 is a projection 88, while a projection 89 extends from the other face, and the function of these projections 88 and 89 will later be described.

The shaft 86 is journaled in the frame 10 and bracket 76 respectively, and on each side of the arm 85 carries collars 90 and 91 to which are anchored springs 92 and 93, for a purpose to be later described.

A sleeve 94 is slidably mounted on the tubular extension 13, and carries a key 95 which projects into the keyway 14 to inhibit relative rotative movement of the sleeve 94. At one end the sleeve 94 is provided with an inner annular groove 96, which receives the flange 46 on the sleeve 45. Upstanding from the sleeve 94 are a pair of wing members 97 and 98, which are formed with inwardly projecting tongues 99.

A collar 100 is drivably carried by the shaft section 78, and on each side is provided with spaced ears 101 which receive therebetween the tongues 99. The face of the collar 100, which is adjacent to the collar 82, is provided with lugs 102 which are designed to engage the projection 88. It is notable that the spring 92 is anchored to the collar 100, and serves to normally maintain this collar in a definite predermined position.

A second collar 103, which is similar in all respects to the collar 100, is carried by the shaft section 72. This collar 103 is formed with spaced ears 104 which receive the tongues 99, and with lugs at 105 which are adapted to engage the projection 89.

The shaft 86 carries an operating member in the form of a handle 106 which is availed of when it is desired to extend or retract the blade extensions 32.

The operation of the above described mechanism may be briefly outlined by noting that under ordinary conditions the propeler shaft 12, sleeve 45, planetary gears 56 and 57, propeller hub 15, and all the mechanism carried thereby will rotate with the propeller blades as the latter rotate, to provide the desired driving effects.

Assuming now that one is desirous of extending the blade extensions 32 to their outermost radial position, the lever 106 will be grasped by the operator, and moved in the direction of the arrow at the left hand side of Figure 6.

At this point it is well to note that with the blade extensions 32 in their retracted positions, the sleeve 94 will be moved outwardly with respect to the frame 10, so that the lugs 102 engage the projection 88. Accordingly this movement on the part of the shaft 86, which is caused by the lever 106, causes a rotation of the arm 85 and, due to the connection with the collar 82 at 83, a corresponding rotation of the collar 82. This collar 82, because of the driving relationship established by projection 88 and lugs 102, causes turning of the collar 100. This movement on the part of the collar 100, which is drivably carried by the shaft section 78, causes rotation of the latter, and through the connection of the overlapping projections 77 and 80 causes rotation of the shaft section 72. This rotation or rocking of the shaft section 72 causes a lowering movement of the arm 73 and an upraising movement of the arm 74.

The first mentioned lowering movement of the arm 73 releases the brake band 60, while the upraising of the arm 74 tightens the brake bands 61. As the brake band 61 is tightened the planetary gear 57 is held against rotation while the gear 56 continues to rotate with the propeller shaft 12. As a result the pinion 55 rides around the planetary gear 57, and is rotated by this action. This rotation causes a corresponding movement on the part of the shaft sections 48 and 52, and worm gear 49.

The worm 49 drives the worm gear 39, which is drivably mounted on the shaft 37, and as the latter is rotated the blade extension 32 is extended. At the same time the reduction gearing 40 and 41 is brought into effect to cause a slight turning movement on the part of the gear 43 which engages the rack 44 to move the sleeve 45 inwardly. As the sleeve 45 is moved inwardly, the sleeve 94 is also moved inwardly toward the frame 10, so that when the outer limit of extending of the blade extension 32 is reached, the lugs 88 become free from the lugs 102, whereupon the spring 92 causes the collar 100 to be swung back into so-called neutral position, in which both of the brake bands 60 and 61 are released.

As the projections 88 become disengaged from the lugs 102, the projections 109 engage the lugs 105, so that when it is desired to retract the blades the lever 106 may be moved in the opposite direction indicated by the arrows at the right-hand side of Figure 6, causing a rotation of the shaft 72 in the opposite direction which releases the brake band 61 and applies the brake band 60, whereupon operation the exact reverse of that just described takes place.

It is important to note that under ordinary conditions the diamond toothed clutch elements 50 and 51 perform no useful function. However, they are embodied in the construction to provide a safety factor in the event the other mechanism for discontinuing the drive to the shaft 37 does not properly function. In that event, should the blade extension 32 reach either of its limits of movement, the shaft section 48 will be rotated, but the diamond teeth of the clutch elements 50 and 51 will become disengaged to prevent rotation of the shaft section 52 and thereby prevent material damage.

It is notable that the blade extension 32 is shown as encompassing the blade section 16.

Figure 3:
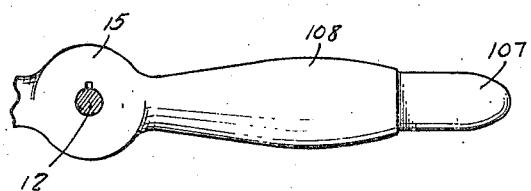
Figure 3 is a plan view of a slightly modified form of propeller.

Figure 3 develops the converse of this arrangement, in which a blade extension identified as 107 may be contained within the stem section shown at 108. In all other respects the construction and operation of the parts will be similar to that above described.

While a preferred specific embodiment of the invention is hereinbefore set forth, it is to be clearly understood that I am not to be limited to the exact construction illustrated and described, because various modifications of these details may be provided in putting the invention into practice within the purview of the appended claims.

I claim:

1. Mechanism of the character described comprising a propeller shaft, a hub assembly drivably carried by the shaft and formed with a recess surrounding said shaft, a propeller stem extending radially outwardly from the hub, a blade extension carried by the propeller stem, a shaft extending through the stem and having threaded engagement with the blade extension, a worm gear on the inner end of said shaft within said recess, a worm in engagement with said worm gear, said worm being carried by a shaft having a pinion at one end, planetary gearing in engagement with said pinion, there being an internal planetary gearing disposed on one side of the pinion, and an externally disposed gear on the other side, and means for selectively braking either of said planetary gears, said braking means comprising a brake band operatively assembled about each of said planetary gears, each of said brake bands having a fixed end and a movable end, a yoke connected to the said movable ends, a shaft drivably carrying said yoke, operating means for rotating said shaft to cause a corresponding movement on the part of the yoke whereby one of said brake bands is tightened about its respective planetary gear while the other brake band is loosened about its respective planetary gear, means for yieldably maintaining said shaft in a neutral position in which both said brake bands are loosened, and blade actuated disconnecting means between said operating means and the said shaft.

2. Apparatus of the character described comprising a propeller shaft, a propeller carried by the shaft including a propeller stem, and a blade extension radially movable with respect thereto, gear mechanism for causing said radial movement of the blade extension, said gear mechanism including a pair of planetary gear members, means for selectively braking one of said planetary gear members to cause effective operation of the gear mechanism, a brake band operatively assembled about each of said planetary gears, each of said brake bands having a fixed end and a movable end, a shaft, connections between said shaft and the movable ends of said brake bands whereby rotative movement of the shaft causes a tightening of one brake band and a loosening of the other, yieldable means for maintaining said shaft in a neutral position in which both of said brake bands are loosened, an operating member, driving connections between said operating member and said shaft whereby said operating member may be availed of to rotate the shaft against the influence of said movable means, and blade actuated disconnecting means between said operating means and the said shaft.

3. Apparatus of the character described comprising a propeller shaft, a propeller carried by the shaft including a propeller stem, and a blade extension movable with respect thereto, gear mechanism for causing said movement of the blade extension, said gear mechanism including a pair of planetary gear members, means for selectively braking one of said planetary gear members to cause effective operation of the gear mechanism, and mechanism for releasing said brake when the limit of movement of the blade extension has been reached, said last named mechanism comprising a sleeve disposed about said propeller shaft and movable axially with respect thereto, there being a gear and rack assembly associated with said aforementioned gear mechanism for causing movement of said sleeve incident to movement of the blade extension with respect to the stem, and operative connections between said sleeve and brake means whereby movement of the sleeve causes releasing of the brake means.

4. Apparatus of the character described comprising a propeller shaft, a hub member disposed about said propeller shaft and formed with a recess about said shaft, a propeller stem extending from said hub, a blade extension on said stem a shaft extending through said stem and having a threaded engagement with the extension of such nature that rotation of the shaft causes movement of the blade extension with respect to the stem, a worm gear on the inner end of said shaft within said recess, a shaft disposed parallel with respect to the propeller shaft and having a worm in engagement with said worm gear, a pinion on one end of said worm gear carrying shaft, an external planetary gear disposed about said propeller shaft and in engagement with said pinion, an internal planetary gear also disposed about said propeller shaft and in engagement with the said pinion, a brake band operatively associated with each of said planetary gears, and operating connections between said lever and brake bands whereby movement of the lever causes application or release of said bands, and means included as a part of said operating connections for releasing either of said brake bands as the blade extension reaches a limit of its movement.

WILLIAM A. BELFIELD.